PNEUMATIC CAPSTAN ASSEMBLY

Filed Sept. 29, 1966

*INVENTOR*
FRIEDRICH R. HERTRICH

By *Robert B. Crouch*
ATTORNEY

United States Patent Office
3,412,915
Patented Nov. 26, 1968

3,412,915
PNEUMATIC CAPSTAN ASSEMBLY

Friedrich R. Hertrich, Boulder, Colo., assignor to International Business Machines Corporation, Armonk, N.Y., a corporation of New York Filed Sept. 29, 1966, Ser. No. 582,813
2 Claims. (Cl. 226—49)

ABSTRACT OF THE DISCLOSURE

A pneumatic capstan assembly employing a pair of oppositely rotatable capstans. The capstans are mounted in a common enclosure in closely spaced parallel relation. The enclosure includes a smooth outer surface along which a member may be transported. A narrow segment of each capstan is exposed to the surface. A separate manifold is open to the surface upstream of and immediately adjacent to the exposed segment of each capstan. Each manifold extends along essentially the full length of the adjacent capstan. A valve selectively connects either manifold to a source of low pressure air and the other to a source of high pressure air.

The present invention relates to a pneumatic capstan assembly and more particularly to an improved means for achieving driving contact between a rotating capstan and a flexible recording medium.

Pneumatic capstans which employ differential air pressure for loading a flexible recording medium, e.g. tape, cards, etc., against the periphery of a rotating capstan are generally known in the art. However, the various capstan constructions heretofore employed introduce stress concentrations in the recording medium which cause wear and result in a reduction in the effective life of the medium. In the existing capstan constructions low pressure air, i.e. partial vacuum, is applied to the interior of the capstan to create a pressure differential extending radially across the peripheral surface of the capstan. This approach has necessitated discontinuities in the capstan surface, usually in the form of spaced perforations or peripheral channels, through which the partial vacuum acts to draw the recording medium into contact with the surface of the capstan. As the recording medium is loaded against the capstan surface the material of the medium is drawn into each of the individual discontinuities and thus flexed across the relatively square edges of the discontinuities. This continued flexing of the recording medium on a very small radius produces stress concentrations and frictional wear which result in a marked reduction in the effective life of the medium.

The object of the present invention is to provide an improved pneumatic capstan assembly for driving a flexible recording medium without adverse effect upon the effective life of the medium.

The above object is realized in the present invention by provision of a pneumatic capstan assembly which employs a continuous cylindrical surface as a driving element and which distributes the driving force evenly across the full width of the recording medium. The present assembly includes a housing having a smooth surface along which a flexible recording medium is intended to be transported. A generally cylindrical capstan is embedded in the housing with a narrow arcuate segment of its periphery protruding through the smooth surface of the housing to contact the flexible recording medium. A manifold is provided in the housing in communication with the upstream side of the capstan. A low pressure air source is connected to the manifold to create a pressure differential at the narrow segment of the capstan periphery to draw the flexible medium into engagement with the rotating capstan.

Other objects and many of the attendant advantages of this invention will be readily appreciated as the same becomes better understood by reference to the following detailed description when considered in connection with the accompanying drawings wherein.

In the use of a flexible recording medium in an information storage system, it is often necessary to transport the medium, i.e. magnetic tape, film chips, tape strips, punched cards, etc., from one location to another, usually during a read/write operation. In such systems pneumatic capstans have provided a convenient means of transporting the medium since with such devices a large driving force can be transmitted to the medium with little or no time delay. The conventional pneumatic capstans, however, are expensive to manufacture due to the extensive amount of machining necessary to provide the perforations or annular channels and the associated air passages employed to produce a pressure differential across the peripheral surface of the capstan. In addition to the manufacturing expense of such capstans, the conventional capstans are also expensive to operate in that the perforations or channels create stress concentrations or wear points in the recording medium which limit the effective life of whatever medium is employed.

Figure 2:
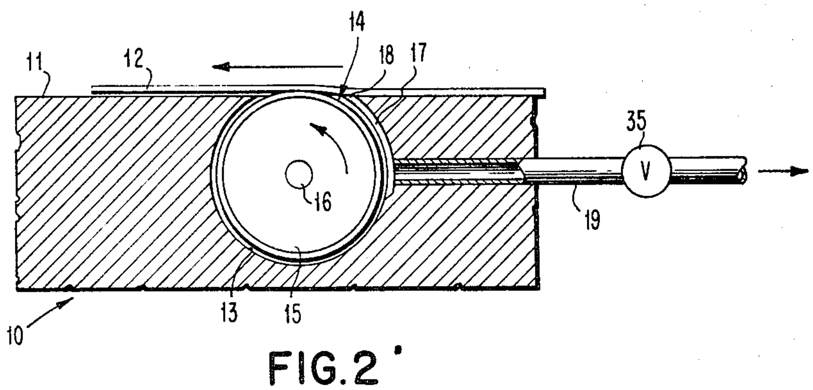
FIG. 2 is an elevation view partly in section of the device of FIG. 1.
Figure 1:
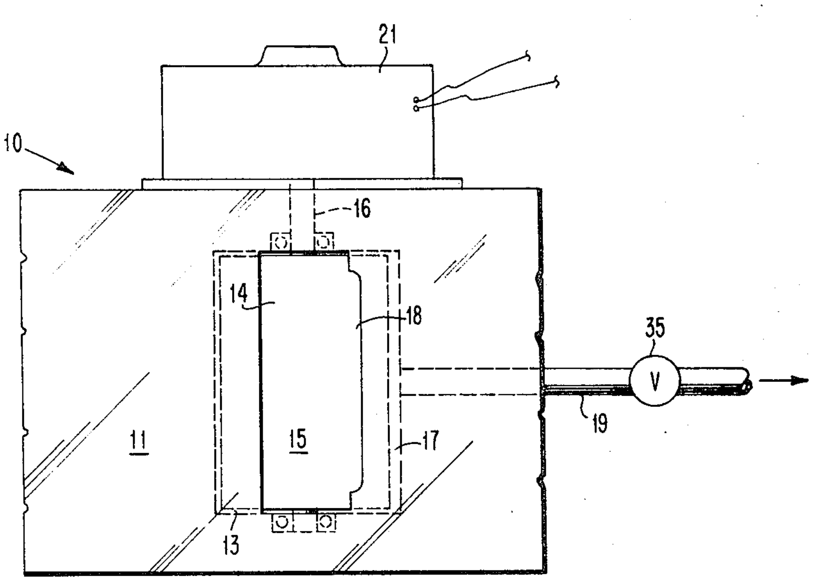
FIG. 1 is a plan view showing the elements of the present invention.

Referring more particularly to the drawings, the housing 10 is illustrated in FIGS. 1 and 2 as including a surface 11 along which a flexible recording medium 12 is adapted to be transported. A transverse bore 13 is provided in the housing, the bore intersecting the surface 11 to form a narrow elongated slot or window 14. A generally cylindrical capstan 15 is received within the bore with close radial tolerance and is mounted for rotation within the bore on a motor driven shaft 16. The capstan is positioned within the bore such that a narrow arcuate segment of its exterior surface protrudes through the window 14. An arcuate pocket 17 formed in the bore provides a manifold at the upstream side of the capstan adjacent the surface 11. The arcuate pocket extends over nearly the full length of the capstan and, as shown at 18 in FIG. 2, is open to the window 14 over the major portion of its length. A low pressure air passage 19 is formed in the housing and is connected to the pocket 17. The assembly of FIGS. 1 and 2 is arranged for movement of the medium from right to left, so the arcuate pocket 17 is located at the upper right hand portion of the capstan circumference, as shown in FIG. 2. In this regard the capstan 15 is constantly rotated in a counter-clockwise manner, such as by a motor 21.

Figure 3:
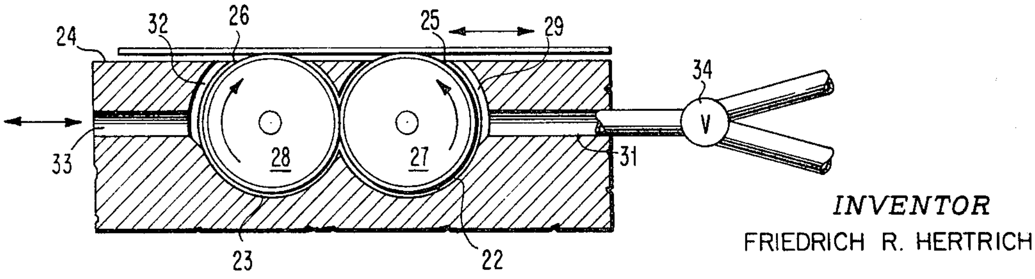
FIG. 3 is an elevation view similar to FIG. 2 of a reversible capstan drive according to the present invention.

The embodiment of FIG. 3 is adapted for movement of the recording medium 12 in either direction. This assembly includes a housing having a smooth surface 24 similar to surface 11 of FIG. 2 and a pair of adjacent bores 22 and 23, each of which intersects the surface 24 to form windows 25 and 26. A pair of generally cylindrical capstans 27 and 28 are rotatably mounted within the bores 22 and 23 in a manner similar to that of FIGS. 1 and 2. The two capstans are either in contact, as shown, or are geared together, so that they may be oppositely rotated by a single motor (not shown). An arcuate pocket 29 is formed at the upper right hand portion of bore 22 such that it connects an air passage 31 with the window 25. A similar arcuate pocket 32 is formed at the upper left hand portion of bore 23 so that it connects an air passage 33 with the window 26. A valve 34 allows air passage 31 to be connected to either low or high pressure air as desired. A similar valve (not shown) provides the same function for passageway 33.

In the operation of the assembly of FIGS. 1 and 2 a source of low pressure air, i.e. partial vacuum, is connected to passage 19 by means of a valve 35. This creates a pressure differential across the strip 12 at the opening 18 of the arcuate pocket 17, thus drawing the strip into contact with the exterior surface of the rotating capstan 15. A driving force is transmitted from the capstan to the medium as long as the valve 35 is open and the low pressure source is connected to the pocket 17. When the valve 35 is closed, the low pressure source is disconnected from the pocket 17 and the medium 12 is then lifted free of the surface of the capstan 15 by the boundary layer air carried by the rotating capstan. The driving force from the capstan to the medium is then interrupted and the medium rides free on the surface 11 of the housing. In the device of FIG. 3, when it is desired to transport the recording medium from right to left, the valve 34 is switched to connect low pressure air to passage 31 while high pressure air is connected to passage 33. By this means the recording medium is drawn into driven engagement with the capstan 27 by means of the pressure differential across the edge of window 25 and is lifted free of capstan 28 by means of the positive air pressure exiting from pocket 32 through window 26. To reverse the direction of drive, low pressure air is connected to the passage 33 and high pressure air to passage 31. In this condition pressure differential is created across pocket 32 and window 26 to draw the recording medium into driven contact with capstan 28 while the positive pressure from pocket 29 through window 25 lifts the medium free of capstan 27.

The bores 13, 22 and 23 can be formed in the housing by a variety of conventional manufacturing techniques, such as casting, drilling, etc., depending upon the material of the housing and perhaps the shape of the surface 11 or 24, i.e., whether the surface is straight or curved. The capstans employed with the present invention may be made of any suitable material and are of generally cylindrical configuration with a continuous peripheral surface. Since no internal air passages are required, the capstans may be solid and need not be hollowed out. The periphery of the capstan may be knurled or roughened or it may be coated with a thin layer of material having a large coefficient of friction, such as polyurethane, etc., to enhance the driving contact with the recording medium. To ensure even distribution of the driving force across the full width of the recording medium the axial dimensions of the capstan and the length of the opening of the arcuate pocket to the window should exceed the width of the medium. In case the capstan does not extend over the full width of the medium, provision may be made to vent the spaces between the ends of the capstan and the ends of the bore to ambient air pressure at the exterior of the housing. This will prevent the edges of the medium from being flexed over the ends of the capstan and avoid the consequent stress concentrations.

What is claimed is:

1. A pneumatic capstan assembly comprising:

a housing having a smooth surface along which a flexible member is adapted to be transported;

a pair of oppositely rotatable capstans mounted in closely spaced parallel relation with a narrow segment of the periphery of each capstan exposed to said surface;

a pair of manifolds extending axially of said capstans, each being open to the surface immediately adjacent to and over essentially the full length of the upstream edge of the exposed segment of each capstan; and means for selectively connecting either manifold to a source of low pressure air and the other manifold to a source of high pressure air to create a pressure differential adjacent one exposed segment and draw the flexible member into frictional contact with one rotating capstan.

2. A pneumatic capstan assembly as set forth forth in claim 1 wherein:

said capstans are in contact and the interior of said housing is in close proximity to said capstans so as to impede the flow of air therethrough between said manifolds.

References Cited

UNITED STATES PATENTS

| | | | |
|---|---|---|---|
| 3,287,010 | 11/1966 | Stone | 271—74 X |

FOREIGN PATENTS

| | | |
|---|---|---|
| 138,117 | 6/1948 | Australia. |
| 872,441 | 7/1961 | Great Britain. |

EDWARD A. SROKA, *Primary Examiner.*